J. SAFLEY, Jr.
GRAIN AND SEED SIEVE.

No. 176,693. Patented April 25, 1876.

Attest:
W. B. Acker
J. M. M'Neill

Inventor:
John Safley, Jr.
Per Parker N. Sweet, Jr. & Co.
att'ys.

UNITED STATES PATENT OFFICE.

JOHN SAFLEY, JR., OF MOUNT VERNON, IOWA.

IMPROVEMENT IN GRAIN AND SEED SIEVES.

Specification forming part of Letters Patent No. 176,693, dated April 25, 1876; application filed March 14, 1876.

*To all whom it may concern:*

Be it known that I, JOHN SAFLEY, Jr., of Mount Vernon, in the county of Linn and State of Iowa, have invented certain new and useful Improvements in Grain and Seed Sieves; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to an improved construction of grain and seed sieves designed to be employed in thrashers, separators, &c.; and it consists of a sieve formed of adjustable slats, and provided with vibrating rakes, which catch the straw and stalks and carry them over the sieve, while the seed or grain passes through the adjustable slats, all as will be hereinafter more fully described and pointed out in the claims.

Figure 1:
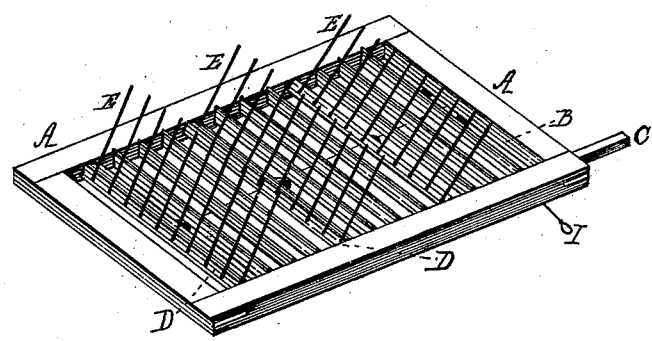
Figure 2:
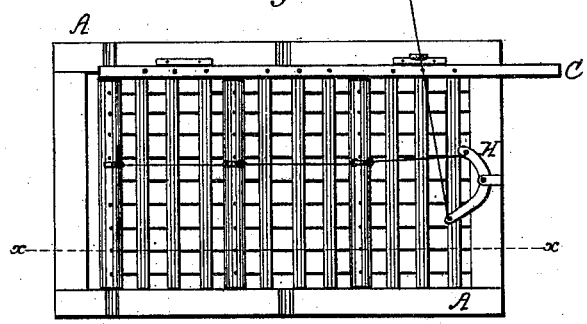
Figure 3:
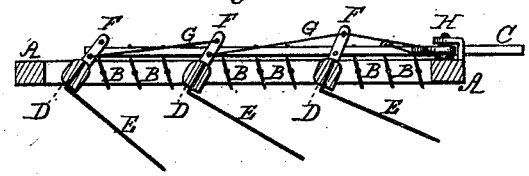

Referring to the drawings, Figure 1 is a perspective view of my improved invention. Fig. 2 is a bottom view of the same, showing the mechanism for operating the vibrating rakes, and also the rod for adjusting the slats in the required position; and Fig. 3 is a section taken on the line $x\ x$ of Fig. 2.

Similar letters of reference occurring on the several figures indicate corresponding parts.

A represents the frame of the sieve, which is of the usual construction, and in which are pivoted the adjustable slats B, said slats being readily opened and closed to any desired degree by means of the rod C, which is connected to each slat on one side. D represents cross-pieces, which are also pivoted within the frame A, between a certain number of the slats B, and to which the rakes E are securely attached. Each of these cross-pieces D is provided at or near their centers with projecting lugs F, through which is passed and secured a wire, G, which connects with one end of an eccentric, H, pivoted to the end of the frame A. The sieve thus constructed is arranged to vibrate from side to side before a fan, in the usual manner; a wire or cord, I, connected to the other end of the eccentric H, being secured to the side of the thrasher, and, as the sieve vibrates from side to side, a vibrating motion is given to the forks E through the motion of the sieve, which is secured in the usual manner.

In the operation of my invention the straw and chaff are caught upon the fork E and thrown back, while the grain passes downward through the slats D, which may be adjusted to suit the requirements of the seed or grain which is being operated upon, a current of air blown through the machine by the ordinary fan assisting the vibrating forks E to throw off the chaff and straw.

The advantage of my invention will be readily apparent, inasmuch as it combines in its construction and operation a high degree of utility, strength, and cheapness, with a ready adaptation to the purpose intended.

Having thus described my invention, what I claim as new, and desire to secure by Letters Patent, is—

In a grain-sieve, constructed as hereinbefore described, the rock-shafts D, provided with lifting-fingers E and arms F, in combination with elbow-lever H, connections G, and shaking frame A, substantially as and for the purpose described.

In testimony that I claim the foregoing as my own invention I affix my signature in presence of two witnesses.

JOHN SAFLEY, JR.

Witnesses:
W. H. MYERS,
MICHAEL SNYDER.